(12) United States Patent
Liao et al.

(10) Patent No.: US 12,341,430 B2
(45) Date of Patent: Jun. 24, 2025

(54) POWER AMPLIFYING CIRCUIT

(71) Applicant: REALTEK SEMICONDUCTOR CORP., Hsinchu (TW)

(72) Inventors: Chen-Fong Liao, Hsinchu (TW); Yi-Chang Tu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 423 days.

(21) Appl. No.: 18/078,587

(22) Filed: Dec. 9, 2022

(65) Prior Publication Data

US 2023/0188039 A1 Jun. 15, 2023

(30) Foreign Application Priority Data

Dec. 14, 2021 (TW) .................... 110146828

(51) Int. Cl.
*H04B 1/40* (2015.01)
*H02M 1/00* (2006.01)
*H02M 3/02* (2006.01)
*H02M 3/158* (2006.01)

(52) U.S. Cl.
CPC ....... *H02M 3/1582* (2013.01); *H02M 1/0025* (2021.05); *H02M 3/1584* (2013.01)

(58) Field of Classification Search
CPC ............. H02M 3/1582; H02M 1/0025; H02M 3/1584; H02M 1/0022; H02M 3/156; H04B 1/04; H04B 1/16; H04B 1/40
See application file for complete search history.

(56) References Cited

U.S. PATENT DOCUMENTS

| | | | |
|---|---|---|---|
| 10,581,325 B1* | 3/2020 | Munroe | H02M 1/08 |
| 2009/0267573 A1* | 10/2009 | Chien | H02M 3/156 |
| | | | 323/222 |
| 2011/0074373 A1* | 3/2011 | Lin | H02M 3/1582 |
| | | | 323/282 |
| 2014/0077870 A1* | 3/2014 | Liu | G05F 1/62 |
| | | | 327/540 |
| 2017/0077817 A1* | 3/2017 | Houston | H02M 3/1582 |
| 2018/0115245 A1* | 4/2018 | Lau | H02M 3/06 |
| 2018/0262223 A1* | 9/2018 | Shioda | H03G 3/3068 |
| 2019/0165736 A1 | 5/2019 | Khesbak et al. | |
| 2021/0336542 A1* | 10/2021 | Li | H02M 3/1582 |
| 2022/0416661 A1* | 12/2022 | Cheng | H02M 3/1582 |
| 2023/0300524 A1* | 9/2023 | Chakkirala | H03F 1/025 |
| | | | 363/13 |
| 2024/0297583 A1* | 9/2024 | Kanjavalappil Raveendranath | H03F 3/183 |

* cited by examiner

*Primary Examiner* — Andrew Wendell
(74) *Attorney, Agent, or Firm* — Birch, Stewart, Kolasch & Birch, LLP

(57) ABSTRACT

A circuit includes a signal modification circuit, a power stage circuit, and a boost converter circuit. The signal modification circuit generates a modified signal according to an input signal. The power stage circuit is electrically coupled to the signal modification circuit and receives a first voltage to amplify the modified signal and generate an output signal. The boost converter circuit selectively controls the amplitude of the first voltage. The signal modification circuit electrically coupled to the boost converter circuit. Therefore, the signal modification circuit is configured to dynamically adjust its own gain corresponding to the value of the first voltage, and the input signal is modified into the modified signal based on the gain of the signal modification circuit.

11 Claims, 4 Drawing Sheets

POWER AMPLIFYING CIRCUIT

CROSS-REFERENCE TO RELATED APPLICATION

This non-provisional application claims priority under 35 U.S.C. § 119(a) to Patent Application No. 110146828 filed in Taiwan, R.O.C. on Dec. 14, 2021, the entire contents of which are hereby incorporated by reference.

BACKGROUND

Technical Field

The instant disclosure relates to a circuit, especially a circuit having a power amplifier.

Related Art

Currently, the power stages of some of the power amplifiers known to the inventor adopt adaptive boost technology, which is capable of boosting the output power as required while maintaining a low output voltage otherwise so as to save power.

However, the adaptive boost technology causes voltage change and thus influences the signals.

SUMMARY

One embodiment of the instant disclosure proposes a circuit comprising a signal modification circuit, a power stage circuit, and a boost converter circuit. The signal modification circuit is configured to generate a modified signal according to an input signal. The power stage circuit is electrically coupled to the signal modification circuit and receives a first voltage for amplifying the modified signal and generate an output signal. The boost converter circuit is configured to selectively control the amplitude of the first voltage. The signal modification circuit is electrically coupled to the boost converter circuit, so that the signal modification circuit is configured to dynamically adjust a gain of the signal modification circuit corresponding to the value of the first voltage and modify the input signal into the modified signal based on the gain of the signal modification circuit.

To summarize the above, in the circuit according to some exemplary embodiments of the instant disclosure, the signal modification circuit is capable of reducing the effect of gain inconsistency due to adaptive boost technology.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
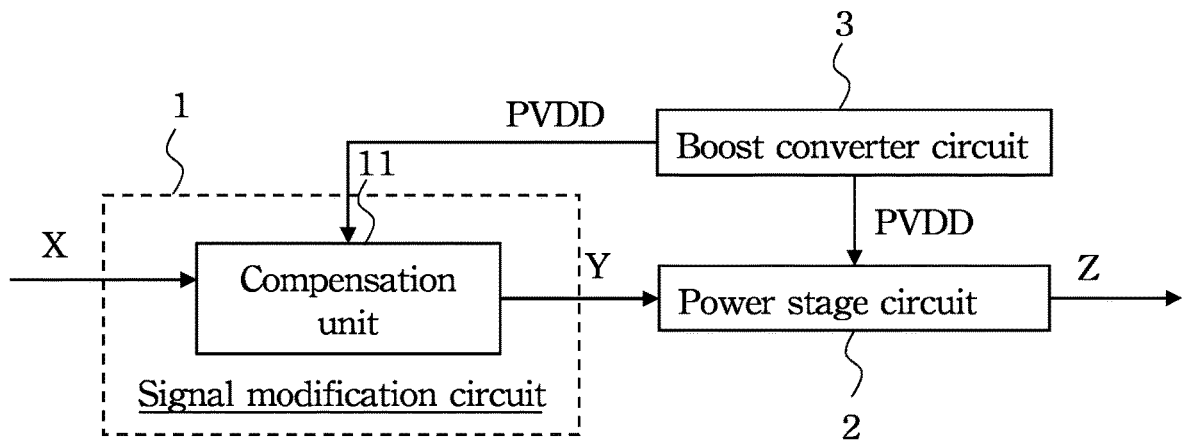
FIG. 1 illustrates a schematic diagram of a circuit according to an exemplary embodiment of the instant disclosure.

FIG. 1 illustrates a schematic diagram of a circuit according to an exemplary embodiment of the instant disclosure. In this embodiment, the circuit comprises a signal modification circuit 1, a power stage circuit 2, and a boost converter circuit 3. The signal modification circuit 1 is configured to modify an input signal X into a modified signal Y. In other words, the signal modification circuit 1 is configured to generate the modified signal Y according to the input signal X. The power stage circuit 2 is electrically coupled to the signal modification circuit 1 and receives a power voltage PVDD. The power stage circuit 2 then adjusts a gain to the modified signal Y and generates an output signal Z based on the adjusted gain. The boost converter circuit 3 adopts adaptive boost technology and selectively controls the amplitude of the power voltage PVDD. As a result, when large signals are processed, the boost converter circuit 3 can increase the power voltage PVDD and thus increase the output power. On the other hand, when small signals are processed, the boost converter circuit 3 can adopt the power voltage PVDD with a lower value and thus save power. In this embodiment, the signal modification circuit 1 comprises a compensation unit 11 electrically coupled to the boost converter circuit 3, so that the compensation unit 11 is configured to dynamically adjust a gain of the compensation unit 11 (a gain of the signal modification circuit 1 is correspondingly adjusted) corresponding to the value of the power voltage PVDD and to modify the input signal X into the modified signal Y based on the gain of the compensation unit 11 (or the gain of the signal modification circuit 1). Accordingly, in this embodiment, the compensation unit 11 (or the signal modification circuit 1) can dynamically adjust its own gain based on the value of the power voltage PVDD so as to maintain the gain of the input signal X at a constant value, thus avoiding inconsistency in the gain to the input signal X due to adaptive boost technology.

In an exemplary embodiment, the power source of the boost converter circuit 3 is a battery, and the boost converter circuit 3 selectively boosts the battery voltage, causing the power voltage PVDD to change between the battery voltage and the boost voltage.

Figure 2:
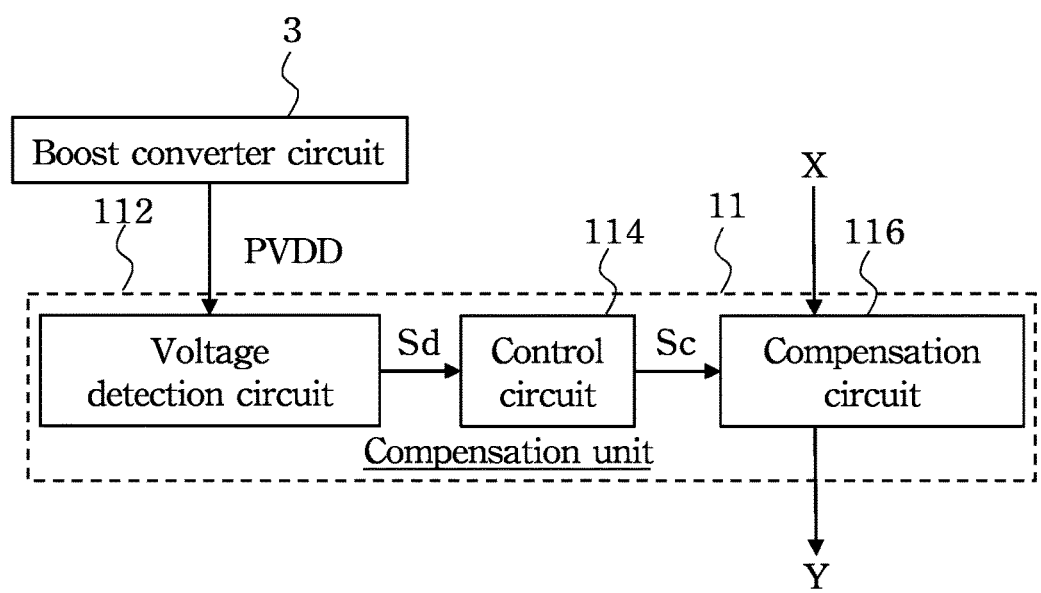
FIG. 2 illustrates a schematic diagram of a compensation unit according to the exemplary embodiment.

FIG. 2 illustrates a schematic diagram of a compensation unit 11 according to the exemplary embodiment. In this embodiment, the compensation unit 11 comprises a voltage detection circuit 112, a control circuit 114, and a compensation circuit 116. The voltage detection circuit 112 is electrically coupled to the boost converter circuit 3 and the control circuit 114 so as to detect the power voltage PVDD and then to output a detected signal Sd to the control circuit 114. The control circuit 114 is electrically coupled to the voltage detection circuit 112 and the compensation circuit 116 so as to output a control signal Sc to the compensation circuit 116 based on the detected signal Sd. The compensation circuit 116 is configured to adjust its own gain based on the control signal Sc. For example, the detected signal Sd may be a voltage or a voltage-related value, and the control signal Sc is a control parameter, and a mapping relationship (such as a mapping table) is present between the detected signal Sd and the control signal Sc. Hence, in this embodiment, through this mapping relationship, the control circuit 114 is capable of outputting the control signal Sc corresponding to the detected signal Sd to the compensation circuit 116, so that the gain of the compensation circuit 116 can be adjusted to a value based on a current power voltage PVDD.

Figure 3:
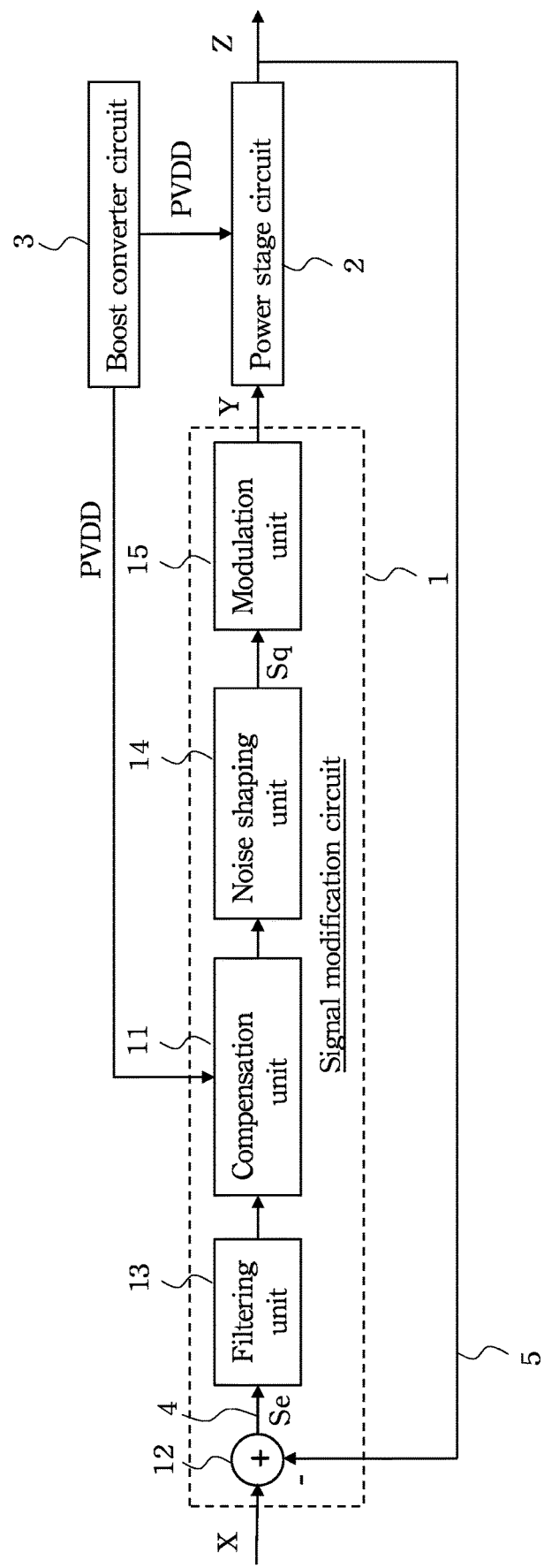
FIG. 3 illustrates a perspective view of the circuit according to the exemplary embodiment.

FIG. 3 illustrates a perspective view of the circuit according to the exemplary embodiment. In this embodiment, the circuit is a negative feedback structure, where the signal modification circuit 1 and power stage circuit 2 are on a forward path 4, and the output signal Z is fed back through a negative feedback loop 5 to the signal modification circuit 1.

The signal modification circuit 1 further comprises a negative feedback unit 12, a filtering unit 13, a noise shaping unit 14, and a modulation unit 15. The negative feedback unit 12 is configured to generate an error signal Se based on the input signal X and the output signal Z. Specifically, in one or some embodiments, the negative feedback unit 12 is a subtraction unit, and the error signal Se is the difference between the input signal X and the output signal Z. The filtering unit 13 is electrically coupled between the negative feedback unit 12 and the compensation unit 11 so as to suppress the noises on the forward path 4. To be more precise, in this embodiment, the filtering unit 13 suppresses all the noises between the output of the filtering unit 13 and the output signal Z of the power stage circuit 2, thus leading to the enhancement of total harmonic distortion+noise (THD+N) capability of the output end. The filtering unit 13 may be, but not limited to, a loop filter. The noise shaping unit 14 is electrically coupled to the compensation unit 11 so as to perform a noise shaping process on the error signal Se and then to generate a shaped signal Sq. The noise shaping unit 14 may be, but not limited to, a sigma-delta modulator. The modulation unit 15 is electrically coupled to the noise shaping unit 14 so as to generate the modified signal Y based on the shaped signal Sq. The modulation unit 15 may be, but not limited to, a pulse-width modulator.

Figure 4:
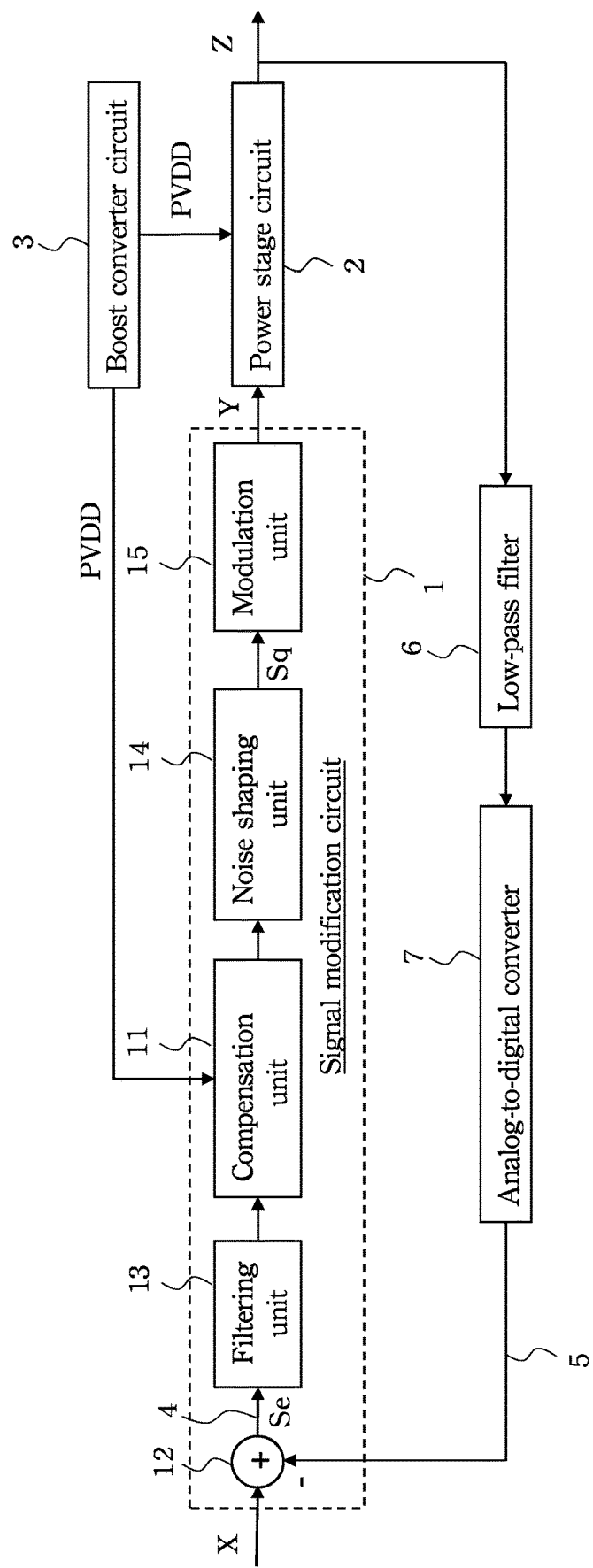
FIG. 4 illustrates a perspective view of a circuit according to another exemplary embodiment of the instant disclosure.

FIG. 4 illustrates a perspective view according to a circuit of another exemplary embodiment of the instant disclosure. Compared with the embodiment shown in FIG. 3, in this exemplary embodiment, a low-pass filter (LPF) 6 and an analog-to-digital converter (ADC) 7 are further provided on the negative feedback loop 5. The low-pass filter 6 performs low-pass filtering on the feedback output signal Z so as to eliminate the noise. The analog-to-digital converter 7 is electrically coupled to the low-pass filter 6 so as to convert the filtered output signal Z into a digital signal and then to input the converted digital signal into the negative feedback unit 12. In this embodiment, the input signal X is also a digital signal.

Figure 5:
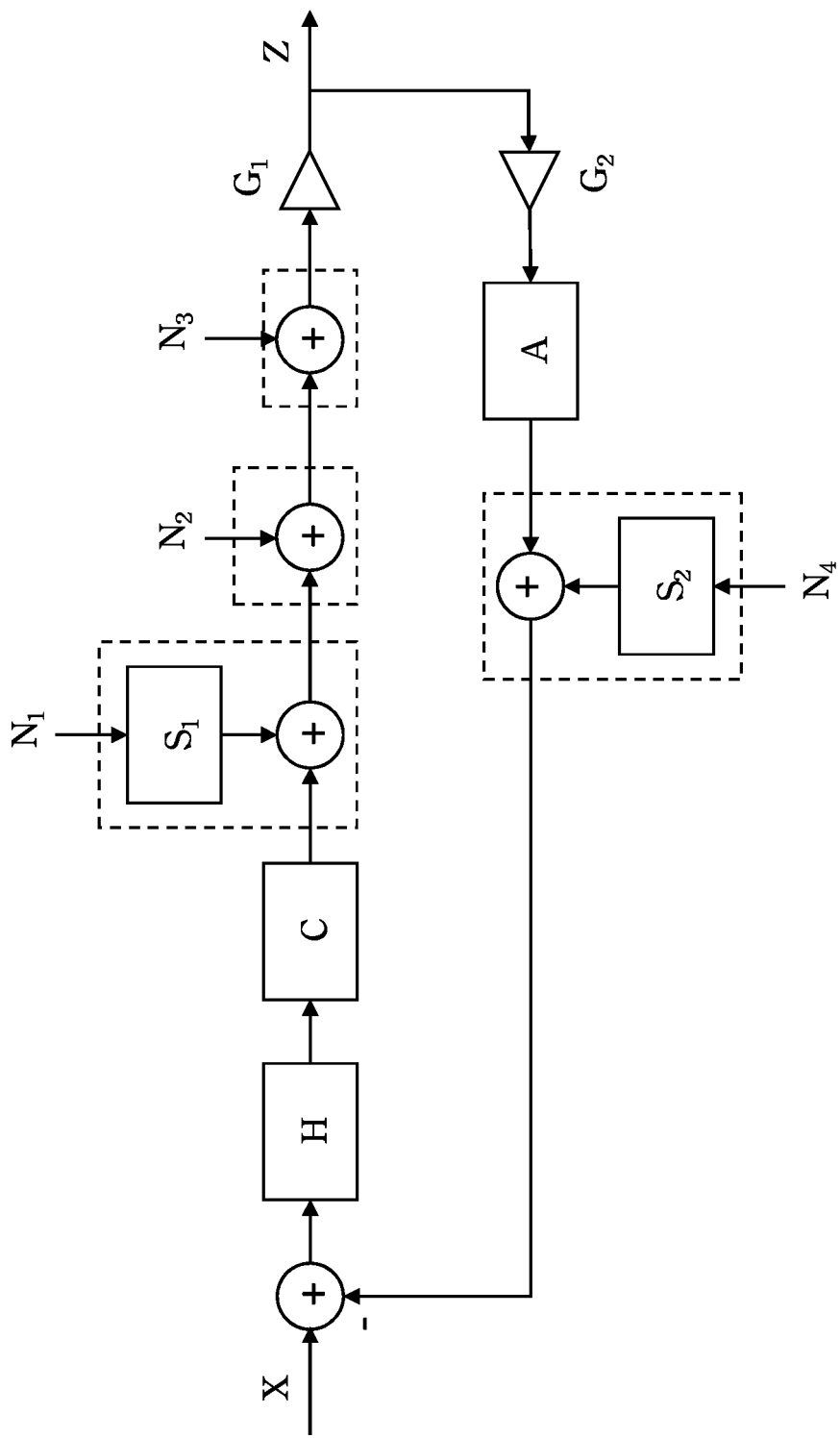
FIG. 5 illustrates a mathematical model according to the circuit shown in FIG. 4.

FIG. 5 illustrates a mathematical model of the circuit shown in FIG. 4. This mathematical model can be used to derive Eq. 1 and Eq. 2, where X denotes the input signal, Z denotes the output signal, H denotes the transfer function of the filtering unit 13, C denotes the transfer function of the compensation circuit 116, $N_1$ denotes the quantization noise of the noise shaping unit 14, $N_2$ denotes the noise generated by the modulation unit 15, $N_3$ denotes the noise generated by the power stage circuit 2, $N_4$ denotes the noise generated by the analog-to-digital converter 7, $S_1$ denotes the transfer function of the noise shaping generated by the noise shaping unit 14, $S_2$ denotes the transfer function of the noise shaping generated by the analog-to-digital converter 7, A denotes the transfer function of the low-pass filter 6, $G_1$ denotes the boost gain, and $G_2$ denotes the buck gain before feedback. $G_1$ is dependent on the adaptive boost technology, and the value of $G_1$ is between the battery voltage and the boost voltage $V_{boost}$. $G_2$ equals the inverse of the boost voltage ($1/V_{boost}$).

$$Z = \frac{HCG_1}{1+L}X + \frac{S_1 G_1}{1+L}N_1 + \frac{G_1}{1+L}N_2 + \frac{G_1}{1+L}N_3 + \frac{HS_2 CG_1}{1+L}N_4 \quad \text{(Eq. 1)}$$

$$L = HCG_1 G_2 A \quad \text{(Eq. 2)}$$

When the power voltage PVDD equals the boost voltage, $G_1$ equals $V_{boost}$, and thus Eq. 1 and Eq. 2 can be expressed as Eq. 3 and Eq. 4, respectively.

$$Z = \frac{HC}{1+L_1}V_{boost}X + \frac{S_1}{1+L_1}V_{boost}N_1 + \\ \frac{1}{1+L_1}V_{boost}N_2 + \frac{1}{1+L_1}V_{boost}N_3 + \frac{HS_2 C}{1+L_1}V_{boost}N_4 \quad \text{(Eq. 3)}$$

$$L_1 = HCA \quad \text{(Eq. 4)}$$

According to Eq. 3 and Eq. 4, when the amplitude of the power voltage PVDD changes corresponding to the input signal X, the boost gain to the input signal X is also changed, thus affecting the output signal Z. As a result, in order to maintain the consistency of the boost gain, the gain of the compensation circuit 116 is to be controlled, so that the gain of the compensation circuit 116 changes corresponding to the change of the power voltage PVDD. Therefore, in this embodiment, the following relationship is to be met: $G_1 \cdot G_2 \cdot C = 1$, where C denotes the gain of the compensation circuit 116 in the compensation unit 11 of the signal modification circuit 1. Hence, Eq. 5 can be obtained. According to Eq. 5, the input signal X remains constant. Furthermore, the gain C of the compensation circuit 116 is also capable of suppressing the influence of noises $N_1$-$N_3$ on the output.

$$Z = \frac{H}{1+HA}V_{boost}X + \frac{HS_1}{1+HA}\frac{V_{boost}}{C}N_1 + \\ \frac{1}{1+HA}\frac{V_{boost}}{C}N_2 + \frac{1}{1+HA}\frac{V_{boost}}{C}N_3 + \frac{HS_2}{1+HA}V_{boost}N_4 \quad \text{(Eq. 5)}$$

In some of the exemplary embodiments, the compensation circuit 116 is a DC gain circuit. In some other exemplary embodiments, the compensation circuit 116 is a shelving filter.

To summarize the above, in the circuit according to some exemplary embodiments of the instant closure, the compensation circuit 116 is capable of reducing the effect of gain inconsistency due to adaptive boost technology. Moreover, in some embodiments, the compensation circuit 116 is further capable of suppressing the influence of the noises of the circuit on the output. In some embodiments, the adoption of adaptive boost technology allows power saving. In some embodiments, the adoption of the negative feedback structure is capable of achieving effective noise suppression.

What is claimed is:
1. A circuit comprising:
   a signal modification circuit configured to generate a modified signal according to an input signal;
   a power stage circuit electrically coupled to the signal modification circuit to receive a first voltage for amplifying the modified signal and generate an output signal; and
   a boost converter circuit configured to selectively control the amplitude of the first voltage;
   wherein the signal modification circuit is electrically coupled to the boost converter circuit which dynami- cally adjusts a gain of the signal modification circuit corresponding to the value of the first voltage, and modifies the input signal into the modified signal based on the gain.

2. The circuit according to claim 1, wherein the signal modification circuit comprises a compensation unit comprising:
   a voltage detection circuit electrically coupled to the boost converter circuit so as to detect the first voltage and then to output a detected signal;
   a control circuit electrically coupled to the voltage detection circuit so as to output a control signal based on the detected signal; and
   a compensation circuit electrically coupled to the control circuit so as to adjust the gain based on the control signal.

3. The circuit according to claim 1, wherein the circuit is a negative feedback structure, the signal modification circuit and the power stage circuit are on a forward path, and the output signal is fed back to the signal modification circuit through a negative feedback loop.

4. The circuit according to claim 3, wherein the dynamical adjustment of the gain of the signal modification circuit satisfies the following relationship: $G_1 \cdot G_2 \cdot C = 1$, where C denotes the gain of the signal modification circuit, $G_1$ denotes a boost gain, and $G_2$ denotes a buck gain before feedback.

5. The circuit according to claim 3, wherein the signal modification circuit comprises:
   a negative feedback unit configured to generate an error signal based on the input signal and the output signal;
   a compensation unit electrically coupled to the boost converter circuit, wherein a gain of the compensation unit is dynamically adjusted corresponding to the value of the first voltage;
   a filtering unit electrically coupled between the negative feedback unit and the compensation unit so as to suppress noises on the forward path;
   a noise shaping unit electrically coupled to the compensation unit so as to perform a noise shaping process on the error signal and then generate a shaped signal; and
   a modulation unit electrically coupled to the noise shaping unit so as to generate the modified signal based on the shaped signal.

6. The circuit according to claim 5, wherein the filtering unit is a loop filter.

7. The circuit according to claim 5, wherein the noise shaping unit is a delta-sigma modulator.

8. The circuit according to claim 5, wherein the modulation unit is a pulse-width modulator.

9. The circuit according to claim 5, further comprising a low-pass filter on the negative feedback loop.

10. The circuit according to claim 9, further comprising an analog-to-digital converter on the negative feedback loop and electrically coupled to the low-pass filter so as to convert the output signal into a digital signal and to input the digital signal into the negative feedback unit.

11. The circuit according to claim 1, wherein the first voltage is a power voltage.

* * * * *